United States Patent Office 2,906,588
Patented Sept. 29, 1959

2,906,588

DYEING OF POLYACRYLONITRILE AND ITS COPOLYMERS

Wilhelm Brunkhorst, Emil Kern, and Hans Baumann, all of Ludwigshafen am Rhine, Germany, assignors to Badische Anilin- & Soda-Fabrik Aktiengesellschaft, Ludwigshafen am Rhine, Germany No Drawing. Application October 23, 1956
Serial No. 617,706

Claims priority, application Germany October 25, 1955

5 Claims. (Cl. 8—55)

This invention relates to an improved process of dyeing textile material consisting of polyacrylonitrile and its copolymers.

We have found that structures of polyacrylonitrile or of copolymers containing acrylonitrile can be dyed very fast yellow to orange shades by using basic dyestuffs of the general formula

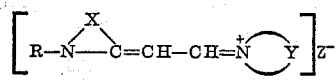

or

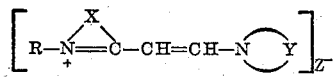

in which X and Y represent divalent groups which make up the two nitrogenous rings to five- or six-membered heterocyclic ring systems, R an alkyl, cycloalkyl, aryl or aralkyl group and Z⁻ the anion of a medium strong to strong acid of a coefficient of dissociation between about $10^{-1}$ and $10^{-5}$.

The heterocyclic five- or six-membered ring system containing the radical X in the above formulae can be for example a thiazole, selenazole, pyridine, pyrimidine or indolenine ring; the radical Y should form, with the nitrogen atom, an indole, carbazole or quinoline ring which is hydrogenated in the hetero ring. All the ring systems may if desired also carry neutral substituents, such as halogen atoms or alkyl aryl, hydroxyalkyl or alkoxy groups. Those dyestuffs are especially suitable for the process according to this invention in which at least one of the two heterocyclic ring systems moreover contains ortho-anellated benzene or naphthalene rings, which may if desired be further substituted by halogen atoms, alkyl, alkoxyl, carbalkoxyl and other neutral groups. As anions there come into question for example those of the halogen hydracids, sulfuric and methylsulfuric acids, para-toluenesulfonic acid and perchloric acid.

Mixtures of these dyestuffs with one another or with other basic dyestuffs, as for example with the dyestuffs described and claimed in the copending application Ser. No. 587,503, filed May 28, 1956, by Helmut Pfitzner, Hans Baumann, Julius Eisele and Wilhelm Federkiel, can also be used in the process according to this invention. Dyestuffs of this kind can be obtained by known methods, for example by condensing aldehydes of the formula

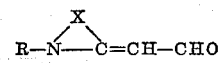

with secondary amines of the formula

or, however, by condensing methylene compounds of the formula

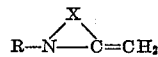

or their salts with formyl compounds of the formula

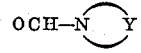

(the formyl compounds can also be used in the form of Schiff's base). Finally the said methylene compounds or their salts may be condensed with heterocyclic imines of the formula

in the presence of agents having a formylating action, as for example formylamides.

For dyeing with the dyestuffs described above there are suitable for example flocks, fibres, yards, bands, knitted and woven fabrics of pure polyacrylonitrile or of copolymers of acrylonitrile with other vinyl compounds, such as vinyl chloride, vinylidene chloride, vinyl fluoride, vinyl acetate, vinyl propionate, vinyl pyridine, vinyl imidazole, vinyl alcohol, acrylic acid, methacrylic acid, acrylic acid esters, methacrylic acid esters, acrylamides and/or methacrylamides.

In principle the dyeing may be carried out in acid or neutral or weakly alkaline baths. The pH-value can therefore be altered during the dyeing, and this may be sometimes of advantage. The baths are in general best exhausted at weakly acid pH-values.

The most favorable dyeing temperatures are different according to the goods to be dyed which are used. In general the goods are entered into the dyebath at about 40° to 60° C. and dyed at the boiling temperature; it is possible to dye under static pressure at above 100° C. to 130° C. The coemployment of the usual dyeing assistants is sometimes advantageous but usually unnecessary.

The dyestuffs can also be added to spinning solutions which contain polyacrylonitrile or copolymers of acrylonitrile with other vinyl compounds. The spun-dyed structures thus obtained can if desired be further dyed or shaded in aqueous baths with other dyestuffs, in particular with the basic dyestuffs described and claimed in the copending application Ser. No. 587,503 aforesaid.

The dyeings obtained are distinguished by vivid, powerful shades, by purity of shade and by very good fastness properties.

As compared with the comparable azomethine dyestuffs, which are formed by condensation of aldehydes of the formula

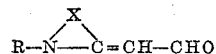

with primary aromatic amines and the use of which has already been recommended for dyeing polyacrylonitrile, the dyestuffs specified in the present specification are of better fastness to light.

The following examples will further illustrate this invention but the invention is not restricted to these examples. The parts are parts by weight.

*Example 1*

0.5 part of the dyestuff of the formula

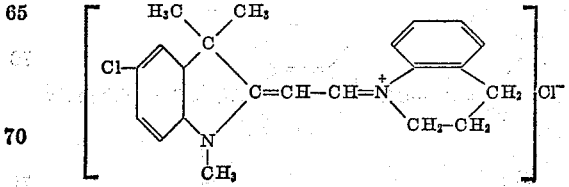

are made into a paste with 10 parts of 10% acetic acid, dissolved by pouring hot water thereover and into the solution made up to 2,000 parts with water at 50° C. there are introduced 50 parts of a fabric of a copolymer of 95% of acrylonitrile and 5% of butyl methacrylate. The whole is heated to boiling temperature within 30 minutes and kept at this temperature for 90 minutes. After rinsing and drying, a powerful, very level, yellow dyeing of excellent fastness properties is obtained.

The same result is achieved when, instead of using acetic caid, there are added to the bath at the same time as the fabric is entered, 3 parts of ammonium acetate which hydrolyses during the dyeing process and causes a gradually increasing acid medium by reason of the expulsion of the ammonia formed.

A dyeing of similar shade of color is obtained by using dyestuffs of the formulae

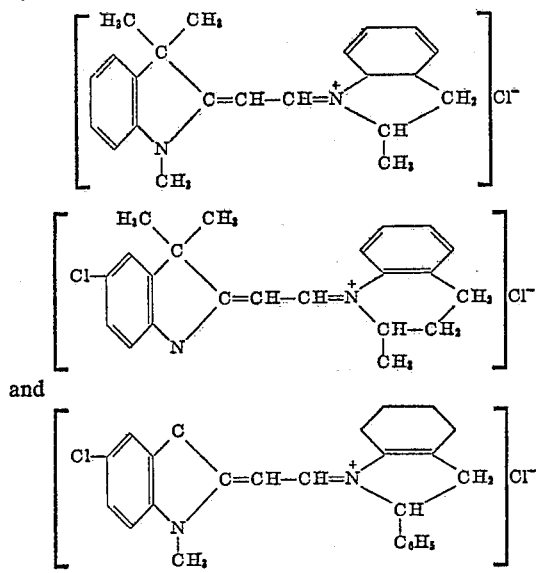

and

*Example 2*

Into a dyebath which contains 0.6 part of the dyestuff of the formula:

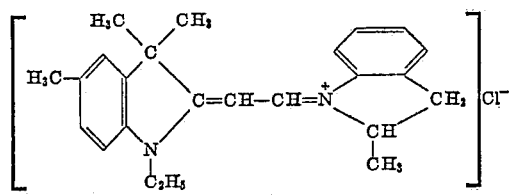

6 parts of 30% acetic acid and 6 parts of sodium acetate in 4000 parts of water there are introduced at 50° C. 100 parts of a polyacrylonitrile fabric and dyeing is carried out as described in Example 1. A very fast greenish yellow dyeing is obtained. Instead of acetic acid there may also be used 3.5 parts of 85% formic acid or 2.0 parts of 98% sulfuric acid. The dyeing may also be commenced in a bath made weakly alkaline by ammonia or sodium acetate and carried to completion with the gradual addition of small amounts of an organic or inorganic acid up to pH values of about 4 to 5.

Very fast dyeings are obtained on polyacrylonitrile by using in the same way the following dyestuffs, the color of the dyeings obtained being indicated:

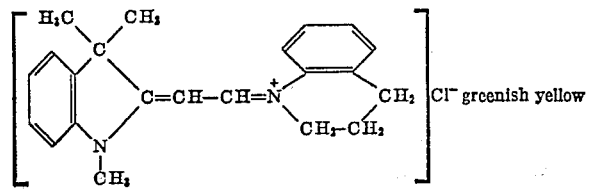

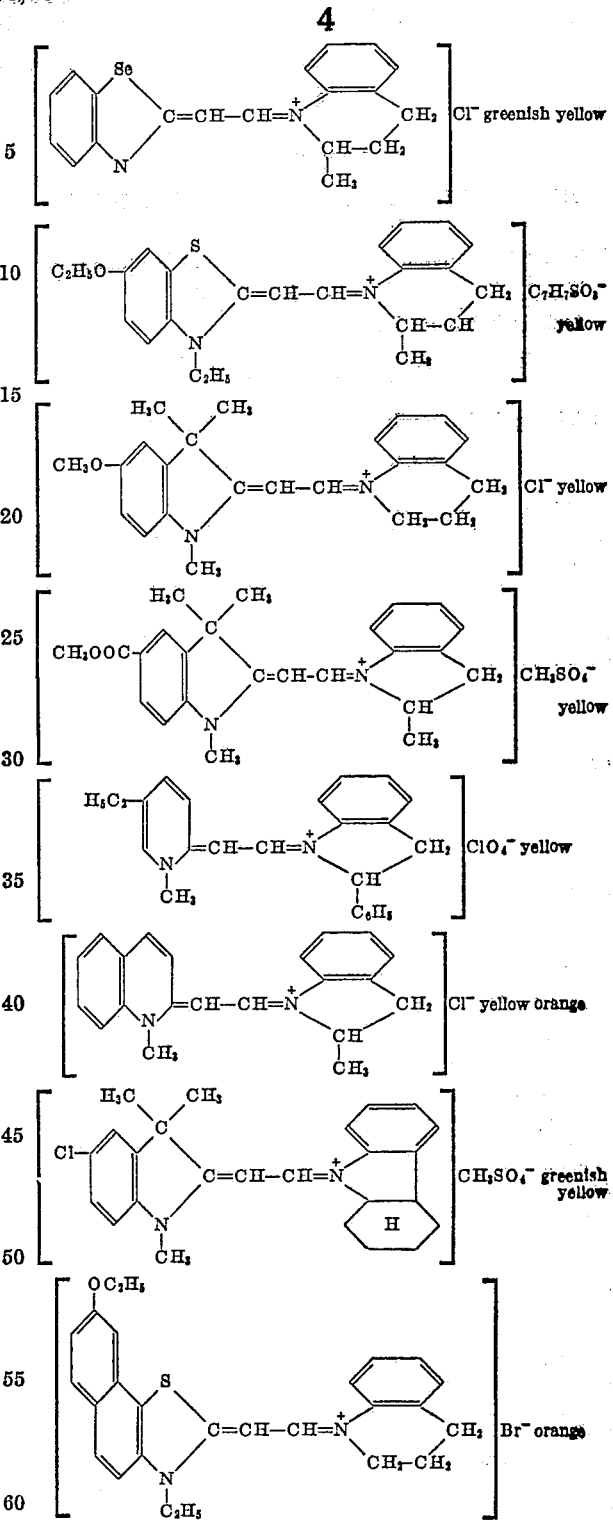

*Example 3*

100 parts of a fabric of a copolymer of 90% of acrylonitrile, 5% of vinyl acetate and 5% of vinyl pyridine are dyed as described in Example 1 with 0.8 part of the dyestuff of the formula:

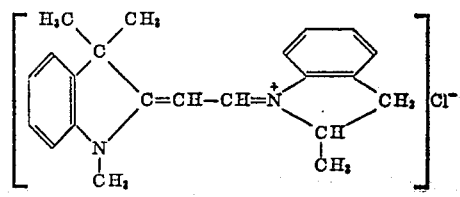

and 0.16 part of the dyestuff of the formula:

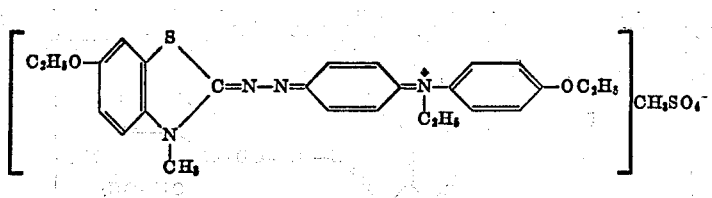

A green dyeing of excellent fastness properties is obtained.

Example 4

A solution of 10 parts of the dyestuff of the formula:

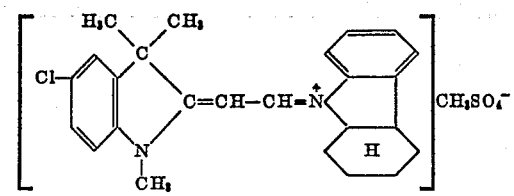

in dimethylformamide is added to a spinning solution which consists of a solution of 1000 parts of polyacrylonitrile in the necessary amount of dimethyl formamide. By spinning a material is obtained which is dyed very fast greenish yellow shades.

Example 5

20 parts of a fabric of a copolymer of 95% of acrylonitrile and 5% of butyl methacrylate are introduced into a dyebath, adjusted to pH 5 with sulfuric acid, at about 50° C. which contains 0.8 part of the dyestuff of the formula:

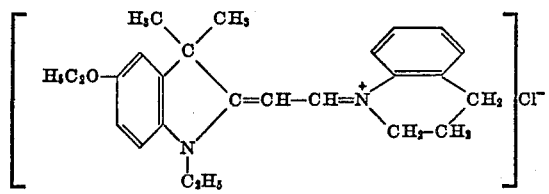

and 20 parts of sodium sulfate in 1000 parts of water. The bath temperature is raised within 5 minutes to 85° C. and within another 30 minutes to 100° C. Dyeing is then continued for 1 hour at boiling temperature. A completely level yellow dyeing is obtained by working in this way.

Example 6

50 parts of skein yarn of a copolymer of 40 parts of acrylonitrile and 60 parts of vinyl chloride are dyed on a spray dyeing machine with a dyebath, adjusted to a pH value of 2.5, of 15 parts of potassium chloride, 5 parts of triethanolamine and 0.5 part of the dyestuff of the formula:

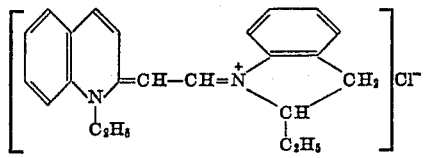

in 1000 parts of water. The temperature, after the introduction of the goods, is raised very rapidly to 90° C. and then within 30 minutes to 100° C. Dyeing is then continued for 1 hour at the boil. A yellow, completely level dyeing is obtained.

Example 7

In a bale apparatus, 80 parts of flocks of a copolymer of 95% of acrylonitrile and 5% of butyl methacrylate are dyed in a bath adjusted to a pH value of 2.5 which contains 20 parts of triethanolamine and 0.4 part of the dyestuff of the formula:

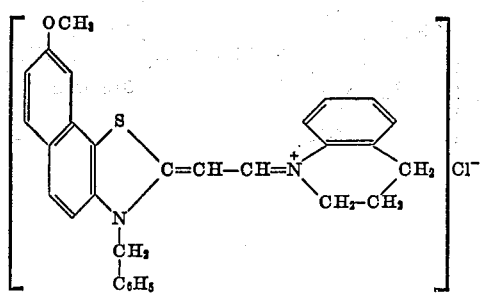

in 1000 parts of water. The temperature of the dyebath is raised within a very short time to 75° C. and then within 15 minutes to 90° C. and in a further 30 minutes to 100° C. A completely level orange dyeing is thus obtained.

What we claim is:

1. A dyed textile material distinguished by a color having an improved quality of light fastness comprising an acrylonitrile polymer containing at least 40 percent by weight of acrylonitrile which is dyed with a basic azomethine dyestuff selected from the group consisting of

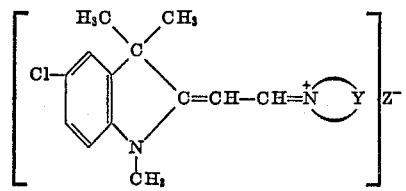

and

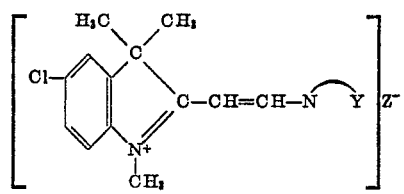

wherein Y stands for a divalent radical completing the nitrogen-containing ring to form a heterocyclic ring selected from the class consisting of unsubstituted and neutrally substituted dihydro indole, tetrahydro quinoline and hexahydro carbazole ring systems, and Z is an anion of a water-soluble acid having a coefficient of dissociation between about $10^{-1}$ and $10^{-5}$.

2. The dyed textile material of claim 1 wherein the basic azomethine dyestuff has the cationic formula

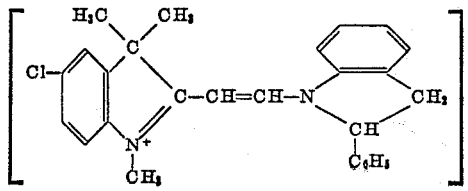

3. The dyed textile material of claim 1 wherein the basic azomethine dyestuff has the cationic formula

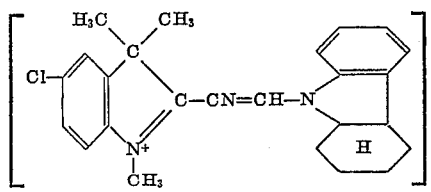

4. The dyed textile material of claim 1 wherein the basic azomethine dyestuff has the cationic formula

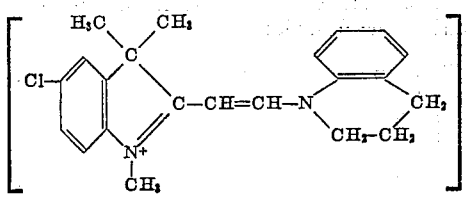

5. The dyed textile material of claim 1 wherein the basic azomethine dyestuff has the cationic formula

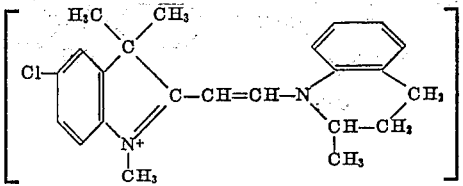

References Cited in the file of this patent

UNITED STATES PATENTS

| | | |
|---|---|---|
| 2,077,063 | Wolff | Apr. 13, 1937 |
| 2,155,447 | Roh | Apr. 25, 1939 |
| 2,263,749 | White | Nov. 25, 1941 |
| 2,764,466 | Bidgood | Sept. 25, 1956 |